United States Patent

[11] 3,589,408

[72] Inventor George A. Salensky
 Metuchen, N.J.
[21] Appl. No. 787,954
[22] Filed Dec. 30, 1968
[45] Patented June 29, 1971
[73] Assignee Union Carbide Corporation
 New York, N.Y.

[54] METHOD OF PACKAGING EPOXY SOLDERS
 1 Claim, 1 Drawing Fig.
[52] U.S. Cl. ................................................ 141/1,
 141/11
[51] Int. Cl. .................................................. B65b 1/04
[50] Field of Search ............................. 141/1, 67,
 263, 374, 390, 11

[56] References Cited
 UNITED STATES PATENTS
 494,979 4/1893 Dawson ...................... 141/390

1,881,106 10/1932 Vogt et al. .................... 141/263
 FOREIGN PATENTS
 501,863 3/1939 Great Britain ................ 141/1

Primary Examiner—Jr. Bell
Attorneys—Paul A. Rose, Aldo J. Cozzi and James C. Arvantes ABSTRACT: This invention relates to the production of epoxy solders, which are characterized by excellent paint absorption properties, by formulating curable compositions based on cycloaliphatic diepoxides and dimers of fatty acids and deaerating the compositions so formulated. This invention also relates to a method of packaging an epoxy solder by feeding the epoxy solder into a container while concurrently displacing the air from the container.

PATENTED JUN 29 1971
3,589,408
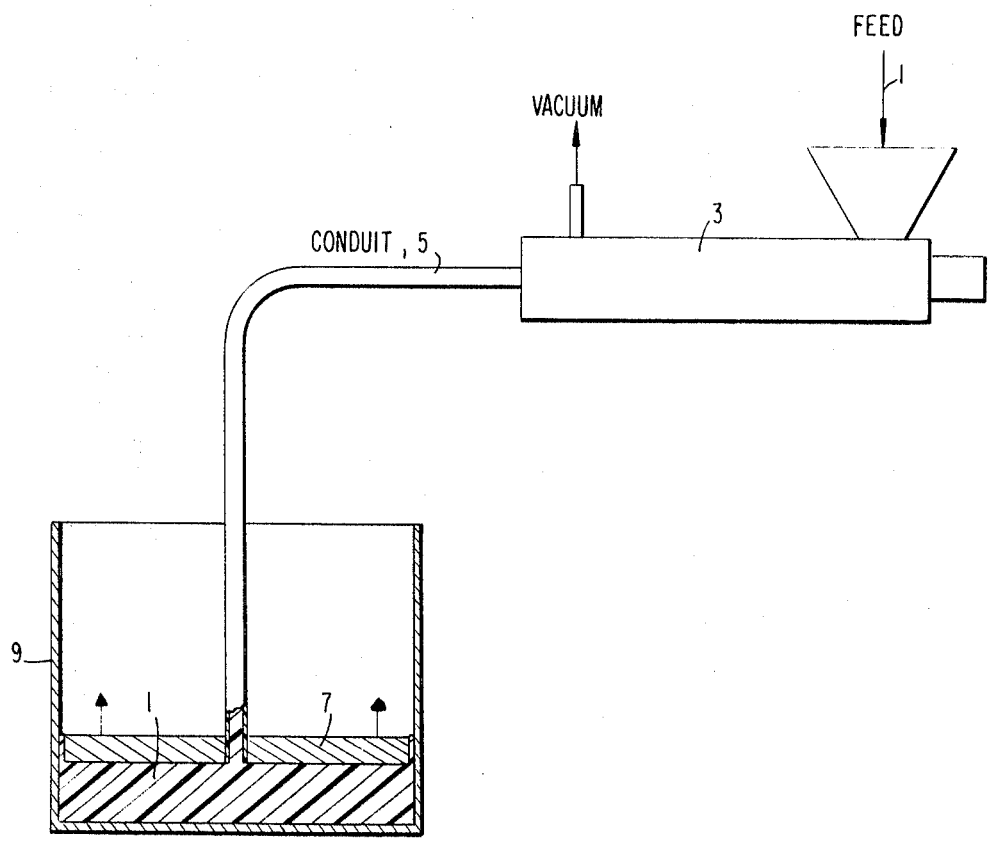
INVENTOR
GEORGE A. SALENSKY
BY *James C. Arrantes*
ATTORNEY

METHOD OF PACKAGING EPOXY SOLDERS

This invention relates to a method of producing and a method of packaging epoxy solders. More particularly, this invention relates to a method which provides for the production of a uniform grade of epoxy solders from different batches of curable compositions of the same formulations, based on cycloaliphatic diepoxides and dimers of unsaturated fatty acids, with the result that the epoxy solders so produced are characterized by a uniformity of paint absorption properties and surface gloss when applied to metal objects and painted over. The epoxy solders, produced according to the present invention, when applied to metal objects and painted over, are completely masked by the paint and are indistinguishable from the adjacent, painted metal surfaces.

As a rule, epoxy solders, based on curable compositions of cycloaliphatic diepoxides and dimers of unsaturated fatty acids, are characterized by excellent paint absorption properties which allows these solders, when applied to metal surfaces, to be masked by being painted over. It has been found, however, that when these solders are painted over, their paint absorption properties and surface gloss characteristics vary and depend upon the particular composition from which the solder has been produced. In other words, the properties of these solders has tended to vary even though the solders were produced from compositions which ostensibly had the same formulation.

In one aspect, the present invention provides for the production of epoxy solders which, when applied to a desired surface and painted over, are characterized by a uniformity of paint absorption characteristics and surface gloss. Thus, it is now feasible to use in the same soldering operation, epoxy solders produced from two different compositions of the same formulation.

According to the present invention, epoxy solders, having the desirable properties previously discussed, can be produced by formulating curable compositions based on cycloaliphatic diepoxides and dimers of unsaturated fatty acids and subjecting the compositions so formulated to a deaeration operation.

The epoxy solders can be conveniently deaerated by being extruded through a vacuum vented extruder of the type which is described subsequently. In the accompanying drawing, the deaeration operation is shown in combination with the overall packaging operation of this invention wherein an epoxy solder 1 is extruded through vented extruder 3 into and through conduit 5 which feeds epoxy solder 1 under follower plate 7 which is in container 9 and is movable relative to container 9. As epoxy solder 1 is fed from vented extruder 3 into and through conduit 5 and under follower plate 7, it displaces the air from beneath follower plate 7, forms a seal between the interior walls of container 9 and the outer edge of follower plate 7 and forces follower plate 7 to move relative to container 9 as is shown in FIG. 1 of the accompanying drawing. A more detailed description of the deaeration operation and the packaging operation, taken in conjunction with the accompanying drawing, will be set forth subsequently in this application.

The compositions which are deaerated in accordance with the present invention are a mixture comprising:

a. Diepoxides of cycloaliphatic esters of dicarboxylic acids having the formula:

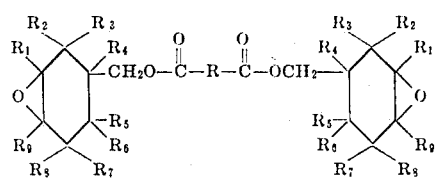

wherein $R_1$ through $R_9$, which can be the same or different, are hydrogen or alkyl radicals generally containing 1 to 9 carbon atoms inclusive and preferably containing 1 to 3 carbon atoms inclusive as for example methyl, ethyl, n-propyl, n-butyl, n-hexyl, 2-ethylhexyl, n-octyl, n-nonyl and the like; R is a divalent hydrocarbon radical generally containing 3 to 9 carbon atoms inclusive and preferably containing 4 to 6 carbon atoms inclusive, as for example, alkylene radicals, such as trimethylene, tetramethylene, pentamethylene, hexamethylene, 2-ethyl hexamethylene, octamethylene, nonamethylene, and the like; cycloaliphatic radicals, such as 1,4-cyclohexane, 1,3-cyclohexane, 1,2-cyclohexane, and the like.

Among specific diepoxides of cycloaliphatic esters of dicarboxylic acids are the following:
Bis(3,4-epoxycyclohexylmethyl)oxalate,
Bis(3,4-epoxycyclohexylmethyl)adipate,
Bis 3,4-epoxy-6-methylcyclohexylmethyl)adipate,
Bis(3,4-epoxycyclohexylmethyl)pimelate, and the like.
Other suitable compounds are described in U.S. Pat. No. 2,750,395 to B. Phillips et al.

b. A 3,4-epoxycyclohexylmethyl 3,4-epoxy-cyclohexane carboxylate having the formula:

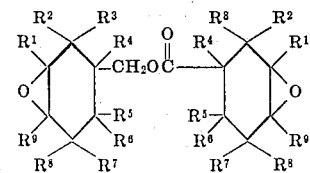

wherein $R^1$ through $R^9$, which can be the same or different, are as defined for $R_1$ in (a).

Among specific compounds falling within the scope of the above formula are the following: 3,4-epoxycyclohexylmethyl 3,4-epoxycyclohexanecarboxylate, 3,4-epoxy-1-methylcyclohexyl-methyl 3,4-epoxy-1-methylcyclohexanecarboxylate, 6-methyl-3,4-epoxycyclohexylmethyl 6-methyl-3,4-epoxycyclohexanecarboxylate, 3,4-epoxy-3-methylcyclohexylmethyl 3,4-epoxy-3-methylcyclohexanecarboxylate, 3,4-epoxy-5-methylcyclohexyl-methyl 3,4-epoxy-5-methylcyclohexanecarboxylate. Other suitable compounds are described in U.S. Pat. No. 2,890,194 to B. Phillips et al.

c. A dimer of an unsaturated monobasic fatty acid as for example, dimers of acids having the formula:

$$(C_\alpha H_{2\alpha}-1)-COOH$$

wherein $\alpha$ is an integer having a value of 6 to 20 inclusive such as Δ9,10-decylenic acid, Δ9,10-dodecylenic acid, palmitoleic acid, oleic acid, petroselinic acid, vaccenic acid and the like and dimers of unsaturated acids having the formula:

$$(C_\beta H_{2\beta}-3)-COOH$$

wherein $\beta$ is an integer having a value of 6 to 20 inclusive such as linoleic acid and the like, Other suitable dimers are enumerated in U.S. Pat. No. 2,994,660.

d. Anhydrides of polybasic acids as for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptyl succinic anhydride, hexylsuccinic anhydride, methylbutylsuccinic anhydride, methyltetrahydrophthalic anhydride, nonenylsuccinic anhydride, octenylsuccinic anhydride, pentenylsuccinic anhydride, propylsuccinic anhydride, 1,2,4,5-benzentetracarboxylic dianhydride, citraconic anhydride, 4-nitrophthalic anhydride, 1,2-naphthalic anhydride, 2,3-naphthalic anhydride, 1,8-naphthalic anhydride, tetrabromophthalic anhydride, and tetraiodophthalic anhydride. Also suitable are cyclopentanetetracarboxylic dianhydride, benzophenonetetracarboxydianhydride, trimellitic anhydride. Polymeric anhydrides or mixed polymeric anhydrides of sebacic, maleic, adipic, pimelic, terephthalic and isophthalic acids are also suitable. Other suitable anhydrides are enumerated in U.S. Pat. No. 3,117,099 to Proops et al.

e. Alkaline earth silicates such as calcium silicate and magnesium silicate, and preferably magnesium silicate.

f. Stannous acylates having the formula:

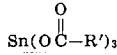

wherein R' is a monovalent hydrocarbon radical generally containing 2 to 12 carbon atoms inclusive and preferably containing 3 to 10 carbon atoms inclusive. Specific acylates falling within the scope of the formula above, wherein R' can be a saturated, unsaturated, branched or straight chain hydrocarbon radical, are: stannous proprionate, stannous tartrate, stannous butyrate, stannous valerate, stannous caproate, stannous caprylate, stannous octoate, stannous laurate, stannous palmitate, stannous stearate, stannous oleate and the like.

g. Cation exchanged bentonite. The cation exchanged bentonites are known compounds and are exemplified by those disclosed in U.S. Pat. No. 2,531,427 which are onium cation exchanged bentonite. Other suitable bentonites are those disclosed in U.S. Pat. No. 3,102,823 to J.P. Manasia et al. which are quaternary ammonium cation exchanged bentonite. Among suitable cation exchanged bentonites are dimethyldidodecylammonium bentonite, dimethyldihexadecylammonium bentonite, dimethylhexadecylocatedecylammonium bentonite, dimethyldioctadecylammonium bentonite, dimethyloctacyldecylbenzylammonium bentonite and the like. Also suitable are the commercially available cation exchanged bentonites supplied by National Lead Co. under the designation "Bentone."

The amount of materials used to formulate the compositions of this invention are as follows:

a. diepoxides of cycloaliphatic esters of dicarboxylic acids - about one-third to about 3 equivalents and preferably about one-half to about 2 equivalents (based on the epoxy group) per equivalent of:

b. A 3,4-epoxycyclohexylmethyl 3,4-epoxycyclohexanecarboxylate (based on the epoxy groups).

c. Dimer of an unsaturated monobasic fatty acid—about 0.3 to about 0.6 and preferably about 0.4 to about 0.5 equivalent (based on the carboxy groups) per total epoxy equivalent.

d. Anhydrides of polybasic acids—about 0.005 to about 0.2 and preferably about 0.02 to about 0.09 equivalent (based on the anhydride groups) per 100 parts by weight of dimer of an unsaturated monobasic fatty acid (c).

e. Alkaline earth silicate—about 60 to about 140 and preferably about 80 to about 120 parts by weight per 100 parts by weight diepoxide [ (a+b) ] plus about 40 to about 110 and preferably about 58 to about 90 parts by weight per 100 parts by weight of dimer of an unsaturated monobasic fatty acid (c).

f. Stannous acylate—about 3 to about 10 and preferably about 4 to about 8 parts by weight per 100 parts by weight of dimer of an unsaturated monobasic fatty acid (c).

g. Cation exchanged betonite—about 6 to about 14 and preferably about 8 to about 11 parts by weight per 100 parts by weight diepoxide [ (a+b) ] plus about 9 to about 16 and preferably about 11 to about 15 parts by weight per 100 parts by weight dimer of an unsaturated monobasic fatty acid.

In formulating these compositions, it is convenient, from a processing standpoint, to prepare a so-called resin portion and a so-called hardener portion and then blend the two portions together in a paste mixer at room temperature. A typical resin portion and a typical hardener portion are indicated below.

Resin Portion
  Diepoxide of a cycloaliphatic ester of a dicarboxylic acid
  A 3,4-epoxycyclohexylmethyl 3,4-epoxycyclohexymethyl carboxylate
  Cation exchanged bentonite
  Alkaline earth silicate Hardener Portion
  Dimer of an unsaturated monobasic fatty acid
  Cation exchanged bentonite
  Alkaline earth silicate
  Anhydride of a polybasic acid
  A stannous acylate It is to be understood that there may be added to these compositions, through the resin portion or through the hardener portion, such additives as pigments such as carbon black and the like, processing aids such as propylene carbonate, accelerators such as Borontrifluoride or complexes thereof and the like in amounts well known to those skilled in the art.

Referring now to the accompanying drawing, once blended in a paste mixer, the composition is fed to a three roll mill (not shown) sheeted off the three roll mill and fed by any suitable means, for example, a Graco pump (not shown) to vented extruder 3.

The actual type of vented extruder used is not critical and will depend, in part, upon the exact formulation of the composition as well as the desired rate of extrusion and the volume of material to be extruded. Illustrative of suitable vented extruders are the following:

a one inch Killion Extruder and a two inch Royle Extruder

The temperature of the composition as it is being extruded through vented extruder 3 can vary and depends, in part, upon the exact formulation of the composition and the extrusion conditions being employed. As a rule, the temperature of the composition, as it is being extruded, is maintained at about 10°C. to about 70°C., preferably about 20°C. to about 50°C. The desired temperature conditions are reached and maintained by providing vented extruder 3 with band heaters or coolers, as required (not shown). The temperature of the composition within the extruder can be determined by providing vented extruder 3 with a thermocouple (not shown).

Vented extruder 3 is operated under a vacuum generally under a pressure less than about 50 mm. of Hg. and preferably under a pressure of about 0.1 mm. of Hg. to about 25 mm. of Hg. The actual pressure under which vented extruder 3 is operated will depend, in part, upon the rate of extrusion.

Actually the operating conditions of vented extruder 3 are such that the composition, once it leaves the extruder, is substantially free of air. Substantially complete deaeration is achieved when a sample of the extruded composition shows no visible expansion when subjected to the Deaeration Test.

The Deaeration Test is conducted as follows:

A 10 gram sample of material is extruded onto a steel panel and the steel panel, with the extruded sample thereon placed in a vacuum dessicator. The pressure within the dessicator is lowered to 10 mm. of Hg. and the sample subjected to this pressure until there is no visible volumetric expansion of the sample. Generally, it takes about 5 minutes for a 10 gram sample to reach a condition of no visible volumetric expansion under a pressure of 10 mm. of Hg.

In packaging the deaerated composition, i.e., epoxy solder 1, the epoxy solder 1 is fed from vented extruder 3 to container 9 by means of conduit 5, one end of which is connected to the outlet of vented extruder 3 and the other end of which is positioned to feed epoxy solder 1 into container 9 under follower plate 7 which is movable relative to container 9 and serves as an air barrier.

Conduit 5 can be a flexible metal hose such as a steel hose, a plastic flexible hose such as a polyethylene hose or conduit 5 can be a rigid-type hose. A flexible hose is preferred as it provides more freedom of movement to follower plate 7 as it moves relative to container 9. Also, conduit 5 can be constructed of any material which will provide a suitable conduit for feeding epoxy solder 1 from vented extruder 3 into container 9. It is also preferred to provide conduit 5 with smooth interior surfaces in order to provide a smooth path for epoxy solder 1 as it passes therethrough. In those instances wherein conduit 5 is rigid, such as a steel pipe, movement of conduit 5 relative to container 9 can be effected by maintaining conduit 5 stationary and moving container 9 as epoxy solder 1 is fed therein.

Follower plate 7 is so constructed that its outer periphery is spaced from the interior walls of container 9 allowing air to be displaced from beneath follower plate 7 as epoxy solder 1 is fed beneath follower plate 7. Also, the clearance between follower plate 7 and the interior walls of container 9 is such that follower plate 7 moves freely relative to container 9 as epoxy solder 1 is fed therein. As a general rule, there is a clearance of about one-sixteenth to about one-eighth of an inch between follower plate 7 and the interior walls of container 9. The material of construction for follower plate 7 is not critical and can be plastic, metal, cardboard and the like.

As previously stated, conduit 5 is positioned within container 9 so that epoxy solder 1 is fed under follower plate 7. This is conveniently accomplished by providing follower plate 7 with aperture, generally at its center although the aperture can be provided offcenter, and positioning conduit 5 relative to the aperture so that epoxy solder 1 is fed beneath follower plate 7 as it is being extruded into container 9. In order that epoxy solder 1 flows, without substantial interruption beneath follower plate 7, a tight fit is provided between conduit 5 and follower plate 7. If desired, conduit 5 can be made integral with follower plate 7.

In carrying out the packaging operation, epoxy solder 1 is fed beneath follower plate 7 displacing air therefrom. As more epoxy solder is fed beneath follower plate 7, all the air is displaced from beneath follower plate 7 and air is prevented from reentering this space and being trapped within epoxy solder 1 by a seal, formed by epoxy solder 1, between follower plate 7 and the interior walls of container 9. As more epoxy solder is fed into container 9, follower plate 7 is moved to the top of the container with the space between follower plate 7 and the interior walls of container 9 being sealed by epoxy solder 1 as follower plate 7 is moved relative to container 9.

Container 9 can be capped with follower plate 7 in place in those instances wherein follower plate 7 can be separated from conduit 5 or follower plate 7 can be removed prior to capping container 9.

The following examples further illustrate the present invention and are not intended to limit the scope thereof in any manner.

EXAMPLE 1

Two compositions, A and B, were formulated and various samples were taken from each composition and deaerated by being extruded through a 1 inch Killion vented extruder which was operated under the following conditions:

Rate of extrusion = 8 lbs per hour
Temperature = 25°C. (extruder & composition)
Pressure = 0.4 mm. Hg. at the vent Other samples from Compositions A and B were not deaerated. All samples were applied to a lap joint of two steel panels which had been contaminated with a lubricating oil. Each sample was then painted over with black paint and hand buffed.

Samples from Compositions A and B which had been deaerated were characterized by excellent surface characteristics and exhibited a uniformity of paint absorption properties and surface gloss.

Samples from Compositions A and B which had not been deaerated varied as to paint absorption properties and surface gloss.

Compositions A and B were prepared by preparing a "resin portion" and a "hardener portion," the formulations of which are noted below. The portions were blended in a paste mixer and sheeted off a three-roll mill.

|  | Parts by weight | Equivalents |
|---|---|---|
| Resin portion: | | |
| Bis (3,4-epoxy-6-methylcyclohexyl methyl)-adipate, assay=216 gm./gm. mole epoxy | 12.16 | 0.0563 |
| 3,4-epoxycyclohexylmethyl 3,4-epoxycyclohexane carboxylate, assay=131 gm./gm. mole epoxy | 14.86 | 0.1135 |
| Dimethyloctadecylbenzyl ammonium bentonite | 2.53 | |
| Talc (magnesium silicate) | 27.01 | |
| Propylene carbonate | 0.81 | |
| Carbon black | 0.03 | |
| Hardener portion: | | |
| Dimer of linoleic acid | 20.82 | 0.074 |
| Dimethyloctadecylbenzyl ammonium bentonite | 2.70 | |
| Talc (magnesium silicate) | 15.36 | |
| Hexahydrophthalic anhydride | 1.77 | 0.0115 |
| Stannous octoate | 1.17 | |
| Propylene carbonate | 0.78 | |

EXAMPLE 2

A second composition was prepared which was identical to Composition A of example 1. This composition was extruded into a 5 gallon container using apparatus of the type shown in the drawing wherein the vented extruder used was a two inch Royle Extruder which was operating under the following conditions:

Rate of Extrusion = 85 lbs per hour
Temperature = 35°C. (extruder & composition)
Pressure = 1.2 mm. Hg. at the vent It is to be understood that mixtures of materials can be utilized in formulating compositions used in accordance with this invention.

Also, the disclosure of all references noted in this application are incorporated herein by reference.

I claim:

1. A method of packaging an epoxy solder in a substantially air-free condition wherein the epoxy solder is subjected to a vacuum and deaerated and is maintained in a substantially air-free condition during the packaging operation which comprises feeding an epoxy solder to an extruder, extruding said epoxy solder through said extruder while drawing a vacuum therein to deaerate said epoxy solder, extruding said deaerated epoxy solder directly under an air barrier positioned within and at the bottom of a container, and movable with respect to said container, continuing to feed deaerated solder directly under said air barrier with the result that said deaerated solder flows beneath said air barrier, displaces air therefrom, forms a seal between said air barrier and the interior walls of said container thereby preventing air from reentering the space under said air barrier during the packaging operation and moves said air barrier relative to said container and completing the filling of said container with epoxy solder by extruding additional deaerated solder beneath said air barrier.